Oct. 7, 1941.　　　W. PONTOW　　　2,258,146
APPARATUS FOR CONTROLLING THE TEMPERATURE
OF EXOTHERMIC CATALYTIC REACTIONS
Filed April 2, 1937
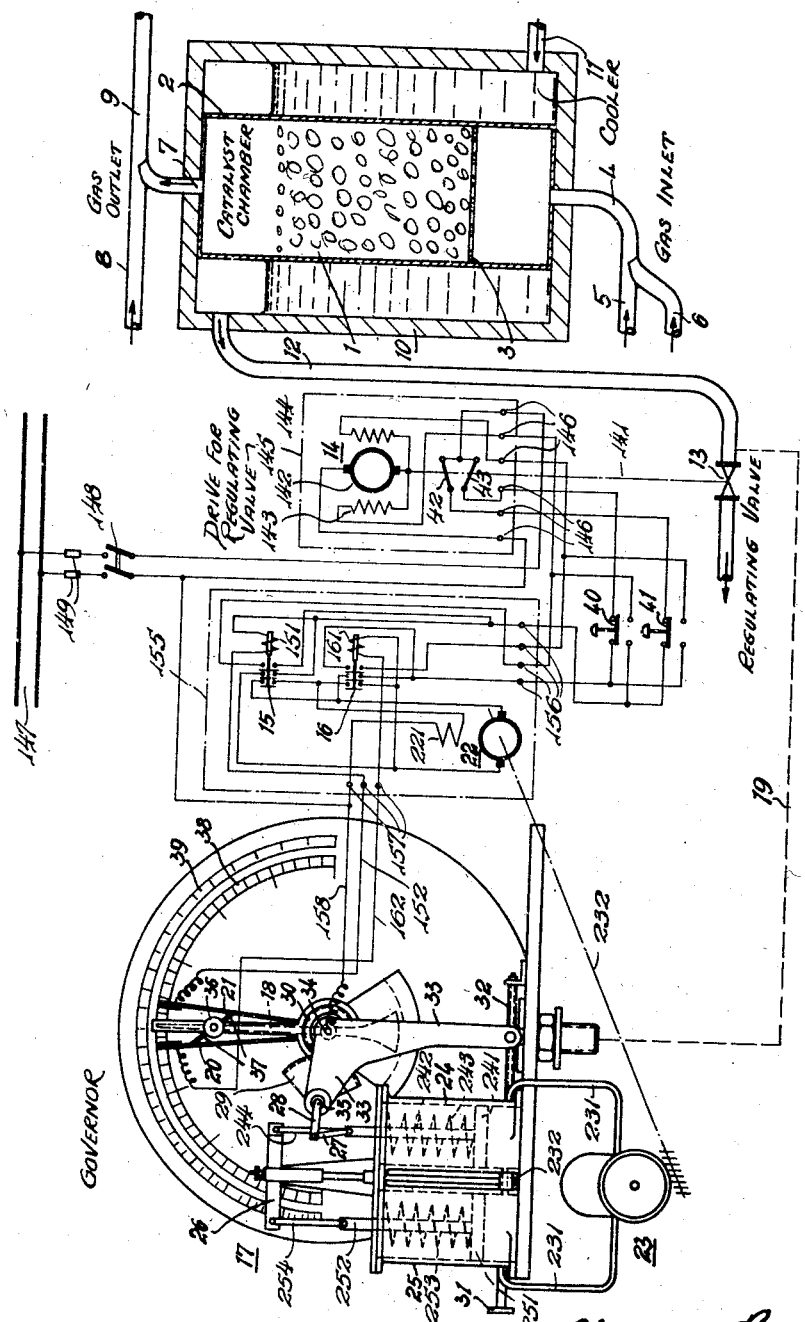

UNITED STATES PATENT OFFICE 2,258,146

APPARATUS FOR CONTROLLING THE TEMPERATURE OF EXOTHERMIC CATALYTIC REACTIONS

Werner Pontow, Berlin-Friedenau, Germany, assignor to Siemens - Schuckertwerke Aktiengesellschaft, Berlin-Siemensstadt, Germany, a corporation of Germany Application April 2, 1937, Serial No. 134,689
In Germany April 3, 1936

9 Claims. (Cl. 23—288)

My invention relates to apparatus for securing an economical utilization of the catalyzer mass when effecting exothermic catalytic reactions for instance when producing benzine by the synthetic method.

The synthetic production of benzine according to the Fischer-Tropsch-method, as it is usually carried out in practice, is effected in the manner that at first coal or coke gas is brought into intimate contact with hydrogen or water vapor in the presence of a catalyzer. During this process heat is continuously developed in the so-called contact oven so that a cooling apparatus must be provided which is capable of dissipating the heat developed. For this reason, the contact oven is surrounded by a cooler which continuously delivers a cooling liquid. The dissipation of heat and, therefore, the temperature may be controlled in this case in a simple manner by causing the cooler to act as an evaporating cooler and by controlling the pressure of the saturated steam produced or by maintaining the pressure at a value corresponding to the desired temperature. To this end, it has hitherto been customary to arrange a valve in the steam discharge conduit of the cooling vessel or of the cooling coil, this valve being operated directly by a piston which moves against the action of a weight and which at the same time is under steam pressure.

Up to the present there has not been any reason whatever for dispensing with this type of pressure regulation. Nevertheless, it presents a drawback which manifests itself in a considerable impairment of the efficiency of the method hitherto employed. This fact, which has hitherto been overlooked and which will be hereinafter more fully dealt with, forms the basis for the present invention. According to the invention, the above-mentioned pressure regulation is effected by means of an indirectly acting governor which maintains a constant or a substantially constant rated value independently of the position of the controlled member.

In order to further explain the invention, the behavior of the catalyzer in a benzine producer, or the like, may first be dealt with.

It lies in the nature of the above-mentioned method or in the nature of the catalyzer that the chemical process takes place in the desired manner only at a predetermined temperature of the contact oven. This temperature must be adapted to the corresponding state of the catalyzer which acts for a certain time sufficiently catalytically at a temperature adjusted during the operation. After this time interval has elapsed, the desired chemical reaction may be reattained only if the temperature in the contact oven is increased to a given value. If the upper limit value of the temperature is finally attained by increasing it step by step, the catalyzer must then be regenerated in order that it may be utilized again. After the catalyzer has been regenerated, the process may be repeated in the same manner; that is to say, the process may begin again at a comparatively low temperature which is then, as above described, increased again step by step within certain time intervals.

However, it has been ascertained that the catalyzer presents another peculiarity which must be taken into account if an optimum economical utilization of the catalyzer mass is to be ensured. It has been found that after each increase in temperature the chemical process—when the same catalyzer mass is further used—does not take place in the desired manner within the temperature range lying below the increased temperature, irrespective of whether the catalyzer has been previously utilized within this temperature range or not. Consequently, if when dealing with a freshly regenerated mass the temperature thereof is suddenly increased, for instance, through the inadvertence of the attendants, to the limit temperature at which the method must be interrupted for regenerating the mass, this entire temperature range is lost to the process. Besides this inconvenience, the oven must remain idle during the time for removing the catalyzer mass which has become useless, and for replacing it by a freshly regenerated mass. The result is a loss of time. It also constitutes a considerable economical loss if the catalyzer mass which forms an important and costly part of the apparatus must be regenerated without having been previously utilized in a proper manner.

If this peculiarity of the catalyzer mass of losing its effectiveness, if the operation temperature is increased without previously utilizing or sufficiently utilizing the catalytic property, is kept in mind when comparing the operation of the above-mentioned conventional apparatus for the production of benzine provided with a pressure regulating valve directly controlled by a loaded piston with the operation of an apparatus in which the pressure regulation is effected, according to the invention by an indirectly acting governor of the above-indicated type, the following basic difference becomes apparent.

If in a convention benzine producing arrangement having its regulating valve directly controlled by means of a piston which moves against the action of a weight, the contact oven is supplied with an increased quantity of gas, the amount of heat developed in the contact oven is also increased. The result is that the evaporating cooler produces steam to a greater extent, the density of steam increases as well as the steam pressure and, therefore, the temperature of the liquid in the oven also increases. Upon the increase in pressure the piston opens the valve arranged in the steam discharge conduit of the cooler to an amount which permits the increased amount of steam to be discharged and, therefore, a decrease in steam pressure results. However, with the conventional control device it is not possible to accurately reestablish the previous pressure, for as soon as the original pressure, after a regulating action, would again act on the piston, not only the piston but also the cone or disk of the control valve would not come again into the original position owing to the rigid coupling of these parts. It therefore follows that the opened cross-section of the valve and the pressure are magnitudes which always correspond to each other, so that the pressure in the case of an increased opened cross-section of the valve which is necessary to permit the passage of the increased amount of steam, must be necessarily greater than the pressure which the governor maintained before. This means that the above-described known governor, upon an increase in load of the apparatus, increases the pressure and in a corresponding manner the temperature of the oven and the catalyzer, although no diminution of the effectiveness of the catalyzer has given cause for such an increase so that, as pointed out above, an operating range of temperature is lost to the process.

This does not occur if, according to the invention, an indirectly acting governor of the above-mentioned type is employed for the pressure regulation. Since with this governor no direct relationship exists between the position of the controlled member and that of the controlling member, and since the latter maintains the rated value constant, a detrimental increase in temperature of the cooling agent upon fluctuations of load of the apparatus is avoided and, therefore, as above described a better utilization of the catalyzer, that is a greater efficiency of the benzine producing arrangement is ensured.

The accompanying drawing shows an apparatus for the production of benzine equipped with an indirectly acting governor according to the invention. The left-hand portion of the drawing shows the governor proper and the right-hand portion the apparatus for producing benzine according to the so-called contact method. The contact pointer governor, illustrated, is of known type and operation.

The right-hand portion of the drawing shows the so-called contact oven. The oven contains a chamber 2 filled with a catalyzer forming an important part for carrying out the method for producing benzine. The catalyzer is amassed on a grate 3 within the chamber 2. At the bottom of the container enters a gas conduit 4, to which is supplied, for instance, coke oven gas through a conduit 5 and steam through a conduit 6. A conduit 7 connects the upper part of the chamber with an outlet conduit 9, a conduit 8 being branched off therefrom to which water gas is supplied. The conduit 9 extends to the apparatus in which the product gained is further treated in a known manner. The chamber 2 is arranged in a cooler 10. A cooling liquid, for instance water, is continuously supplied to chamber 2 through a conduit 11. The steam developing from the cooling liquid is carried off through the conduit 12 in which is arranged a control valve 13. The valve is operatively connected with a motor 14, the connection being schematically indicated by the dot and dash line 141. The armature of the motor is designated by 142 and the field windings by 143 and 144. 42 and 43 designate two stop or limit switches which are operated by the motor 14 and the connection 141, as will be set forth later. Motor 14 and switches 42, 43 are connected to terminals 146, some of which being connected to a supply circuit 147 constituting an auxiliary energy source through a main switch 148 and overload protectors 149, for instance fuses.

A governor 17 and two relays 15 and 16 serve to control motor 14. The operating magnet windings of the relays 151 and 161 are connected to the impulse transmitting part of the governor, hereinafter described, through terminals 157 by leads 158, 152, 162, while the contact devices of relays 15 and 16 are connected to motor 14 through terminals 156 and 146. Switches for effecting a control by hand may be inserted in the connection between terminals 156 and 146, as shown in the drawing.

A second auxiliary motor 22 has its armature and its field winding 221 also connected to the relays 15 and 16 so as to be switched in and out together with motor 14 and to reverse its direction of rotation simultaneously with servo-motor 14. The wiring system interconnecting the above-described parts needs no further explanation in view of its illustration in the drawing and its description of the operation set forth hereinafter. The impulse transmitting part of governor 17 comprises the current carrying contact pointer 18 of a manometer, which is connected to the conduit 12 through a conduit 19, and two counter-contact pointers 20 and 21 associated with pointer 18. If the steam pressure in the conduits 12 and 19 increases, the manometer pointer 18, which forms the pilot element of the control arrangement, deflects in the clockwise direction and closes when it comes into engagement with the counter-contact pointer 21, the circuit between leads 152 and 158, thereby energizing relay winding 151 and thus causing motor 14 through relay 15 to rotate in such a direction as to open the valve 13 a further amount. If the pressure in the conduit 12 decreases the pointer 18 deflects in the counter-clockwise direction and closes by engaging counter-contact pointer 20, the circuit between leads 162 and 158 thereby causing motor 14 through relay 16 to rotate in the opposite direction so that the valve is closed a further amount.

Governor 17 is provided with an automatic adjusting system of hydraulic nature, comprising two cylinders 24 and 25 for liquid such as oil, each cylinder containing a piston 241 and 251 connected to a piston rod 242 and 252 and biased by a spring 243 and 253 respectively. The lower cylinder chambers are connected with a pump 23 by a pipe 231. Pump 23 is connected with motor 22 as indicated by the dot and dash line 232 so as to draw, depending upon its direction of rotation, liquid from the chamber below piston 241 in cylinder 24 and force the liquid into the chamber below piston 251 in the cylinder 25 or vice versa. The piston rods 242 and 252 are secured to a pivotally mounted lever 26 through links 244 and 254. By the movement of the lever 26 an arcuate gear 29 meshing with a pinion 30 is rotated with the aid of the links 27, 28. The counter-contact pointers 20, 21 are secured to the pinion 30. The last-mentioned parts constitute a flexible return motion device of the governor. For adjusting or varying the rated pressure to be maintained constant by the governor, an adjusting screw 31 is provided which is arranged on a rotatably mounted spindle 32. The latter is provided with a nut not shown which when reciprocated rotates a plate 33 about a point 34. The pin 35 for the arcuate gear 29 is arranged in this plate. The limits within which the governor is operated may be adjusted by a hand screw 36 by which a spacer 37 for the two counter-contact pointers 20 and 21 may be moved. The nearer the pointers 20, 21 approach each other, the narrower the limits within which the governor operates. The governor is provided with two scales 38 and 39, one of which indicates the pressures prevailing in the conduit 12 and the other indicates the corresponding temperatures of the saturated steam. The arrangement shown may also be controlled by hand by means of the push-button switches 40 and 41. If switch 40 is actuated, the motor 14 is caused to rotate in such a direction as to open the valve 13, whereas by pressing push-button switch 41 the valve 13 is closed a further amount. Limit switches 42 and 43 ensure an automatic disconnection of the motor 14 in case the valve 13 reaches either end position.

The operation of the above-described arrangement is as follows: As long as the balance of the arrangement in operation is not disturbed, a certain constant pressure prevails in the conduit 12, the pressure depending upon a given opened cross-section of the valve 13. The contact manometer pointer 18, the two counter-contact pointers 20 and 21 and the pivotally mounted lever 26 assume the position shown in the drawing. In this position the motors 14 and 22 are at rest. If now the load of the arrangement increases, that is to say if a greater quantity of gas passing through the conduit 4 is forced through the chamber 2, a greater amount of heat is liberated, thus evaporating more cooling liquid in the container 10. The pressure in the conduit 12 increases and the manometer pointer 18 deflects in the clockwise direction and comes into engagement with the counter-contact pointer 21 which closes the circuit for the relay 15, thus rotating the servo-motor 14 in such a direction as to open the valve 13. At the same time the auxiliary motor 22 is also put into operation and drives the oil circulating pump 23. The pump draws oil from the cylinder 24 and forces it into the cylinder 25. In this manner the piston 241 in cylinder 24 is moved in the downward direction, whereas the other piston moves in the upward direction. The lever 26 is actuated and rotates the arcuated gear 29 in the counter-clockwise direction and the pinion 30, as well as pointer 21 connected to pinion 30, in the clockwise direction. Thereby the circuit which had been closed by the engagement of the pointer 18 with the counter-contact pointer 21 is again broken so that both motors 14 and 22 come to rest. It is apparent from the above description that there is a certain lag between the action of motor 14 and the contact opening effect of motor 22; this lag may be very small and just sufficient to operate valve 13. From this moment a retrogressive movement of the pointer 21 is initiated so that this pointer lags behind the pointer 18 which also moves towards its original position owing to the fact that the valve 13 had been opened a further amount and the pressure in the conduit 12 had been decreased. The retrogressive movement of the pointer 21 is effected by the fact that the oil previously forced into the space below the spring-biased piston 251 arranged in the cylinder 25 flows through a return conduit 232 back into the space below the piston 241 arranged in the cylinder 24. Accordingly, the pistons arranged in both cylinder 24 and 25 move again towards their central or initial position, thus causing the lever 26 to return to its original position. In this manner the arcuate segment 29 moves in the clockwise direction, whereas the pinion 30 in the counter-clockwise direction so that the pointer 21 secured to the pinion 30 actually carries out the return motion. If the further opening of the valve 13 effected by the impulse transmitted decreases the pressure in the conduit 12 to the original value no other control impulse is necessary, since in this case the pointer 21 does not reach again the pointer 18. Otherwise the pointer 18 comes into contact with the pointer 21, whereby a circuit is closed which energizes servo-motor 14 to cause the valve 13 to open a further amount. If the valve is not yet sufficiently opened, the process is repeated until the pointer 21, which always returns to its original position no longer comes into engagement with the pointer 18.

When comparing the contact manometer pointer 18 as an impulse transmitting member with the displacement piston of a directly operating control device of the conventional benzine producing arrangement, as introductorily mentioned, a striking difference becomes apparent. In the known arrangement, a given position of the displaceable piston always corresponds, as already mentioned, to a definite position of the controlled valve. According to the invention, however, such rigid relationship between the position of the controlled valve and that of displaceable control element does not exist. The pointer 18 returns at the end of the regulation to its original position independently of the position the valve 13 assumes.

The invention is not limited to the application of an evaporating cooler for cooling the contact oven nor to the control of the cooling by a pressure regulator. The invention is independent of any type of cooler and may also be used in connection with a direct temperature control or also with an arrangement for controlling the amount of cooling medium as the case may be. Furthermore, the invention is not limited to the above-described method for the production of benzine but it may also be used in such cases where similar operating conditions prevail.

I claim as my invention:

1. In an apparatus for effecting exothermic catalytic reactions at a constant temperature, comprising a catalyzer chamber, means for charging and discharging said chamber with the substances to be exposed to the catalyzer, and an evaporative closed cooling system for cooling said catalyzer chamber, in combination, an adjustable device for regulating the temperature in said cooling system, a driving motor connected with said device, an indirectly operating governor for controlling said motor, said governor having an impulse transmitting means containing a deflectable pilot member and a deflectable follower member for producing control impulses when engaging each other, said pilot member being operatively connected with said cooling system so as to be deflected in response to departures of said temperature from a given value, said follower member being operatively connected with said motor so as to be deflected in accordance with the adjustment of said device, and an operative connection between said two members and said driving motor for actuating said motor in accordance with said control impulses, said governor and said connection being designed to allow said member to move according to said temperature departures independently of the position of said regulating device.

2. In an apparatus for effecting exothermic catalytic reactions at a constant temperature, comprising a catalyzer chamber, means for charging and discharging said chamber with the substances to be exposed to the catalyzer, and an evaporative closed system for cooling said catalyzer chamber, the combination of an adjustable device for regulating the temperature of said cooling system, a driving motor connected with said regulating device for adjusting the latter, an auxiliary energy source connected to said motor, with a controlling governor connected with said driving arrangement, said governor having actuating means responsive to said temperature, a pilot contact connected with said actuating means, a movable counter-contact disposed to be engaged by said contact, said contact and said counter-contact being electrically connected with said driving motor for actuating said driving motor upon deflections of said pilot contact, a second motor connected with said driving arrangement, means operatively connected with said second motor to cause said counter-contact to move in the same direction as said contact and thus break the contact between the two, and means tending to restore the original position of rest of said counter-contact, whereby said governor by indirect action maintains said temperature constant at a given value independently of the position of said temperature regulating device.

3. An arrangement for effecting exothermic catalytic reactions at a constant temperature, particularly for synthetically producing benzine, comprising a contact oven including a catalyzer chamber, means for charging said chamber with the substances to be brought to reaction and for discharging the reaction product, and an evaporative closed fluid system for cooling said chamber, in combination with an adjustable device for regulating the temperature of said cooling system, a driving motor operatively connected with said device, an auxiliary energy source for supplying actuating energy to said motor, controlling means interposed between said energy source and said motor and designed to cause said motor to operate said adjustable device in either controlling direction in accordance with governing impulses, a governor having pilot means operatively connected with said oven arrangement so as to be responsive to said temperature, said pilot means having a movable pilot element, two cooperative elements disposed on either side of said pilot element and individually engageable by the latter in accordance with the direction of movement of said pilot element, said pilot element and said two cooperative elements being connected with said controlling means so as to effect said governing impulses, driving means to cause the engaged cooperative element to move in the same direction as said pilot element in correspondence with the adjustment of said device, and means for returning said cooperative element into its position of rest when said driving means have ceased operating, whereby said temperature is maintained constant independently of the position of said adjustable device.

4. In an arrangement for effecting exothermic catalytic reactions at a constant temperature, especially for synthetically producing benzine, comprising a catalyzer chamber, means for charging and discharging said chamber with the substances to be exposed to the catalyzer, and an evaporative closed fluid system for cooling said chamber, the combination of a device for regulating said cooling system, a reversible electric motor operatively connected with said device, a current source connected with said motor, and a relay set connected with said current source and said motor for controlling said motor, with a governor having a movable pilot contact, means for moving said pilot contact in correspondence with departures of the temperature in said cooling system from a given value, two counter-contacts disposed on either side of said pilot contact and individually engageable by the pilot contact upon deflections of the latter from its position of rest, said pilot contact and said counter-contacts being connected with said relay set so as to cause by their contact closure said motor to move said device in that direction which effects a temperature change causing said pilot contact to return to its position of rest, a mechanism for moving said counter-contacts in the same direction as said pilot contact and thus break the contact between them and the pilot contact, said mechanism being operatively connected with said motor so as to be operated simultaneously and according to the direction of rotation of said motor, and means for restoring the position of rest of said counter-contacts, whereby said governor effects maintenance of said temperature constant at said given value independently of the position of said regulating device.

5. In an arrangement for effecting exothermic catalytic reactions, comprising a catalyzer chamber, means for charging and discharging said chamber, and an evaporative closed cooling system in heat exchanging relation to said chamber, said system having an inlet for liquid and an outlet for vapor, the combination of a valve disposed in said outlet for regulating the vapor pressure of said system, a reversible electric motor operatively connected with said valve for adjusting the latter, a current source for energizing said motor, and a relay set connected with said current source and said motor for controlling the operation and the direction of rotation of said motor, with a governor having a pressure responsive pilot member connected with said system, a movable pilot contact connected with said member in order to be deflected in accordance with departures of said pressure from a given value, two counter-contacts disposed on either side of said pilot contact and individually engageable by the pilot contact upon deflections of the latter from its position of rest, said pilot contact and said counter-contacts being connected with said relay set so as to cause by their contact closure said motor to adjust said valve in that direction which effects a temperature change causing said pilot contact to return in its position of rest, a second motor, means connected with said second motor to cause said counter-contact to move in the same direction as said pilot contact and thus break the contact between the two, said second motor being operatively connected with said driving motor so as to be operated simultaneously and according to the direction of rotation of said driving motor, and means for restoring the position of rest of said counter-contacts, whereby said governor effects maintenance of said temperature constant at said given value independently of the position of said valve.

6. In an apparatus for effecting exothermic catalytic reactions, having an adjustable evaporative closed cooling system, for regulating the temperature of said reactions, in combination, a motor operatively connected with said system for adjusting the latter, an auxiliary engine source connected with said motor, a control arrangement disposed between said motor and said source for connecting and disconnecting said motor, a governor operatively connected with said control arrangement, said governor having a movable pilot element and at least one cooperative counter-element, said pilot element being connected with said apparatus so as to be deflected in correspondence with departures of the temperature of said cooling system from a given value, a separate motor mechanically connected with said counter-element and electrically connected with said control arrangement so as to cause said counter-element to move in the same direction as said pilot element and thus break the contact between the two, and means tending to return said counter-element into its position of rest, whereby said temperature is maintained constant at said given value.

7. In an apparatus for effecting exothermic catalytic reactions at a constant temperature, having a regulatable evaporative closed cooling system for controlling the temperature of the catalytic reaction, in combination, reversible drive means for automatically adjusting said cooling system, an auxiliary energy source connected with said drive means, a governor for controlling said drive means, said governor having an impulse transmitter connected with said driving means and comprising two cooperative movable members, one of said members being connected with said cooling system and responsive to a condition dependent upon the temperature of said cooling system said other member being connected with said means so as to be adjusted in accordance with the adjustment of said means, whereby said two members transmit control impulses to said driving means when said members are differently deflected from a position of rest.

8. In an apparatus for effecting exothermic catalytic reactions, comprising a catalyzer chamber and an evaporative closed cooling system for regulating the temperature in said chamber, said cooling system having an inlet for cooling liquid, and an outlet for vapor, in combination, a pressure regulating valve arranged in said outlet, a reversible driving motor connected with said valve, an auxiliary energy source for energizing said motor, and a governor for controlling said motor, a control connection arranged between said governor and said motor, said governor having a pressure responsive pilot member connected with said cooling system and a movable connter-member, said pilot member and said counter-member having a given position of rest and being arranged to operate said control connection when being deflected differently from said position of rest, a second motor electrically connected with said first motor so as to operate in accordance with the operation of said first motor, means connected with said second motor to cause said counter-member to move in the same direction as said pilot member and thus break the contact between the two, and return means connected with said pilot member and tending to maintain said pilot member in its position of rest.

9. An apparatus for effecting exothermic catalytic reactions at a constant temperature, especially for producing benzine, having an evaporative closed cooling system containing a fluid cooling medium, a device for regulating the rate of flow of said medium, in combination with an indirectly operating governor having a movable contact, elastic means tending to maintain said contact in its position of rest, a pilot member for deflecting said contact against the action of said elastic means, said pilot member being responsive to a condition dependent upon departures of said temperature from a given value, a movable counter-contact arranged so as to be engaged by said first contact, a drive operatively connected with said regulating device for adjusting the latter, an auxiliary energy source connected with said drive, an electric relay arrangement connected between said drive and said two contacts for causing said motor to adjust said device to counteract said departures, a second motor electrically connnected with said first motor so as to operate in accordance with the operation of said first motor, and means connected with said second motor to cause said counter-contact to move in the same direction as said first contact and thus break the contact between the two.

WERNER PONTOW.